United States Patent
Chu et al.

(10) Patent No.: US 12,120,273 B2
(45) Date of Patent: Oct. 15, 2024

(54) DISTRIBUTED NETWORK OF CEILING IMAGE-DERIVED DIRECTIONAL MICROPHONES

(71) Applicant: Hewlett-Packard Development Company, L.P., Spring, TX (US)

(72) Inventors: Peter L. Chu, Lexington, MA (US); Jay McArdle, Rochester, IL (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 246 days.

(21) Appl. No.: 17/843,296

(22) Filed: Jun. 17, 2022

(65) Prior Publication Data

US 2023/0412735 A1    Dec. 21, 2023

(51) Int. Cl.
| | |
|---|---|
| *H04M 3/56* | (2006.01) |
| *H04R 1/02* | (2006.01) |
| *H04R 1/34* | (2006.01) |
| *H04R 1/40* | (2006.01) |
| *H04R 3/00* | (2006.01) |
| *H04R 3/12* | (2006.01) |
| *H04R 29/00* | (2006.01) |

(52) U.S. Cl.
CPC ............ *H04M 3/568* (2013.01); *H04R 1/025* (2013.01); *H04R 1/342* (2013.01); *H04R 1/403* (2013.01); *H04R 1/406* (2013.01); *H04R 3/005* (2013.01); *H04R 3/12* (2013.01); *H04R 29/005* (2013.01); *H04R 2201/021* (2013.01); *H04R 2201/401* (2013.01)

(58) Field of Classification Search
CPC ........ H04R 1/025; H04R 1/342; H04R 1/403; H04R 1/406; H04R 29/005

USPC ............ 379/202.01, 201.01, 203.01, 204.01; 381/386, 300
See application file for complete search history.

(56) References Cited

U.S. PATENT DOCUMENTS

| | | | |
|---|---|---|---|
| 7,660,428 B2 | 2/2010 | Rodman | ................. H04R 9/08 |
| 9,565,493 B2 | 3/2017 | Abraham | ................. H04R 1/40 |

(Continued)

FOREIGN PATENT DOCUMENTS

| | | | | |
|---|---|---|---|---|
| JP | 4752403 | 8/2011 | ............... H04R 3/02 |
| WO | 2021 072294 | 4/2021 | ............... H04R 1/26 |

OTHER PUBLICATIONS

Louroe Ceiling Flush-Mount 8" Speaker and Microphone, [B&H Photo & Video product advertisement] https://www.bhphotovideo.com/c/product/944197-REG/louroe_le_227_tli_cf_8_flush_mounted_ceiling.html/, Sep. 15, 2021.

*Primary Examiner* — Thjuan K Addy
(74) *Attorney, Agent, or Firm* — Quarles & Brady LLP (57) ABSTRACT

A method and apparatus for capturing audio including a ceiling mountable second-order differential microphone module. The module including a solid planar baffle having a generally centered aperture, at least one mounting foot to suspend the solid planar baffle approximately parallel with a rear reflecting plane and to space the solid planar baffle at a predetermined distance below the rear reflecting plane, a differential microphone sealably coupled to the planar baffle with a first side of the differential microphone acoustically exposed to an area above the planar baffle and a second side of the differential microphone acoustically exposed to an area below the planar baffle, and a mounting means for mounting the solid rear reflecting panel to the room ceiling.

20 Claims, 11 Drawing Sheets

(56) References Cited

U.S. PATENT DOCUMENTS

| | | | |
|---|---|---|---|
| 10,728,653 B2 | 7/2020 | Graham | H04R 1/40 |
| 10,757,518 B2 | 8/2020 | Lee | H04R 27/00 |
| 10,904,657 B1 | 1/2021 | Chu | H04R 1/40 |
| 11,303,981 B2 * | 4/2022 | Lantz | E04B 9/0435 |
| 11,310,592 B2 * | 4/2022 | Abraham | H04R 1/02 |
| 2010/0158268 A1 * | 6/2010 | Marton | H04R 3/005 |
| | | | 381/92 |

* cited by examiner

DISTRIBUTED NETWORK OF CEILING IMAGE-DERIVED DIRECTIONAL MICROPHONES

FIELD OF THE INVENTION

The present application relates to conference room audio systems.

BACKGROUND

A modern conference room is typically provided with remote conferencing capabilities to allow audio conferencing or audiovisual conferencing to one or more locations remote from the conference room. Often a long conference table is centered in the room with conference participants seated around the conference table. One or more panel displays (or a projector screen) may be mounted to a wall opposite one end of the conference table. Often speakers are mounted in the ceiling above the conference table. One challenge for conference room designers is placement of microphones capable of picking up the voices of people seated around the conference table without picking up room noise, mechanical noise, or feedback from speaker systems. Customers often desire unobtrusive and preferably invisible technology elements. Conference rooms are often large and require distributed speakers to provide adequate volume to participants at the far end of a conference table without overwhelming those at near end. Some existing solutions combine microphone arrays with digital signal processing to provide an expensive and poorer audio quality than table-mounted microphones. Other solutions require suspended microphones that are unappealing to customers. Existing solutions do not work well near loudspeakers.

SUMMARY

In some examples, an audio system is provided with a sound capture device including a solid rear reflecting plane mountable to a room ceiling, a solid planar baffle parallel with the rear reflecting plane and spaced at a distance below the rear reflecting plane, the planar baffle having a generally centered aperture, a differential microphone sealably coupled to the planar baffle with a first side of the differential microphone acoustically exposed to an area above the planar baffle and a second side of the differential microphone acoustically exposed to an area below the planar baffle, and a mounting means for mounting the solid rear reflecting panel to the room ceiling. In certain examples, the sound capture device is incorporated into a drop ceiling tile along with a loudspeaker with a diameter greater than approximately 6.7". In some examples, the solid planar baffle is circular with a diameter of approximately 1.75" and is spaced approximately from the rear reflecting plane and wherein the microphone is a cardioid electret capsule. In some examples, the audio system includes a ceiling mountable omnidirectional microphone, a ceiling mountable loudspeaker, and a controller comprising a plurality of microphone inputs and a sound nullifying circuit. The sound nullifying circuit is operable to receive a first microphone signal corresponding to the sound capture device and a second microphone signal from the omnidirectional microphone and subtract the second microphone signal from the first microphone signal. In some examples, the audio system includes a controller comprising a plurality of microphone inputs and a processor operable to receive a first microphone signal corresponding to the sound capture device and a second microphone signal from a second sound capture device, determine which of the first and second microphone signal has the highest energy in each of a plurality of frequency bands, select the microphone signal having the highest energy in the majority of the plurality of frequency bands, and output the selected microphone signal. In some examples, the plurality of frequency bands comprises 25 Hz wide sub bands spanning 500 Hz to 1500 Hz. In some examples, the controller comprises a plurality of speaker outputs to drive a first speaker mounted within two feet of the sound capture device and a second speaker mounted within two feet of the second sound capture device, and the controller processor is operable to transmit the selected microphone signal to a remote conferencing location, receive an audio signal from the remote conferencing location, and output the received audio signal to the plurality of speaker outputs as part of a two-way audio conference. In some examples, the controller is operable to transmit the selected microphone signal while outputting the received audio signal.

In some examples, an apparatus is provided. The apparatus includes a drop ceiling tile, and a solid rear reflecting plane and a sound capture device affixed to the ceiling tile. The first sound capture device comprises a solid planar baffle parallel with the solid rear reflecting plane and spaced at a distance below the solid rear reflecting plane, the solid planar baffle having a generally centered aperture, and a differential microphone sealably coupled to the solid planar baffle with a first side of the differential microphone acoustically exposed to an area above the solid planar baffle and a second side of the differential microphone acoustically exposed to an area below the planar baffle. In some examples, a lower surface of the drop ceiling tile forms the solid rear reflecting plane. In some examples, the apparatus comprises a loudspeaker with a diameter of at least approximately 6.7". In some examples the apparatus comprises an omnidirectional microphone installed between the loudspeaker and the sound capture device; and a sound nullifying circuit. The sound nullifying circuit, for each of a plurality of frequency bands, adjusts the phase of sound captured by the omnidirectional microphone, adjusts the amplitude of sound captured by the omnidirectional microphone, and subtracts the phase and amplitude adjusted sound captured by the omnidirectional microphone from the sound captured by the sound capture device. In some examples, the solid planar baffle is circular with a diameter of approximately 1.75" and is spaced approximately 0.5" from the rear reflecting plane and wherein the microphone is a cardioid electret capsule. In some examples, the solid rear reflecting plane is the lower surface of the ceiling tile. In some examples, the apparatus comprises a microphone selection circuit to receive a first signal from the sound capture device, receive a second signal from a second sound capture device, determine which of the first and second signal has the highest energy in each of a plurality of frequency bands, select the either the first or second signal based on which has the highest energy in the majority of the plurality of frequency bands, and output the selected signal. In some examples, the plurality of frequency bands comprises 25 Hz wide sub bands spanning 500 Hz to 1500 Hz. In some examples, the loudspeaker has a diameter at least approximately 6.7"

In some examples, an audio-conferencing system is provided. The system includes a first sound capture device including a first solid rear reflecting plane mountable to a room ceiling, a first solid planar baffle parallel with the first rear reflecting plane and spaced at a distance below the first rear reflecting plane, the first planar baffle having a generally centered aperture, and a first differential microphone sealably coupled to the first planar baffle with a first side of the differential microphone acoustically exposed to an area above the planar baffle and a second side of the differential microphone acoustically exposed to an area below the planar baffle, the first differential microphone coupled to a first microphone output; a second sound capture device comprising a second microphone output; a first and second loudspeaker; and a controller. The Controller includes a first analog to digital converter (ADC) operable to digitize a signal from the first microphone output, a second ADC operable to digitize a signal from the second microphone output, a digital to analog converter (DAC) coupled to an amplifier operable to drive the first and second loudspeaker; and a processor coupled to a memory. In some examples, the first sound capture device and the first loudspeaker are integrated into a first drop ceiling tile and the second sound capture device, and the second loudspeaker are integrated into a second drop ceiling tile spaced approximately four feet from the first drop ceiling tile. In some examples, the first sound capture device is mounted to the ceiling approximately directly above a first seating location at a conference table and the second sound capture device is mounted to the ceiling approximately directly above a second seating location at the conference table wherein the first and second seating locations are approximately four feet apart. In some examples, the audio-conferencing system includes an omnidirectional microphone installed between the first loudspeaker and the first sound capture device. The system also includes a sound nullifying circuit to, for each of a plurality of frequency bands, adjust the phase of sound captured by the omnidirectional microphone, adjust the amplitude of sound captured by the omnidirectional microphone, and subtract the phase and amplitude adjusted sound captured by the omnidirectional microphone from the sound captured by the first capture device. In some examples, the solid planar baffle is circular with a diameter of approximately 1.75" and is spaced approximately 0.5" from the rear reflecting plane and wherein the microphone is a cardioid electret capsule. In some examples, the audio-conferencing system includes an omnidirectional microphone mounted between the first sound capture device and the first loudspeaker, a third ADC operable to digitize a signal from the omnidirectional microphone, and a controller circuit to subtract at least a portion of the omnidirectional microphone signal from the first microphone signal. In some examples, the audio-conferencing system includes a microphone selection circuit to receive the digitized first microphone signal, receive the digitized second microphone signal, determine which of the first and second microphone signal has the highest energy in each of a plurality of frequency bands, select the digitized microphone signal having the highest energy in the majority of the plurality of frequency bands, and output the selected digitized microphone signal. In some examples, the plurality of frequency bands comprises 25 Hz wide sub bands spanning 500 Hz to 1500 Hz. In some examples, the first sound capture device and the first loudspeaker are incorporated into a first drop ceiling tile and the second sound capture device and the second loudspeaker are incorporated into a second drop ceiling tile, and the controller is operable to transmit the selected digitized microphone signal to a remote conferencing location, receive an audio signal from the remote conferencing location, and output the received audio signal to the two loudspeakers as part of a two-way audio conference.

In some examples, a method of configuring an audio-conferencing system is provided. The method including mounting to a ceiling a first differential sound capture device comprising a rear reflecting plane, a circular planar baffle parallel mounted parallel to and spaced approximately less than an inch from the rear reflecting plane, and a differential microphone sealed in the center of the baffle and acoustically exposed to each side of the baffle, mounting to the ceiling a second differential sound capture device wherein the second sound capture device is mounted at least four feet from the first sound capture device, mounting a loudspeaker to the ceiling, and coupling the first and second sound capture devices to a conferencing system, and coupling the loudspeaker to the conferencing system. In some examples, the method comprises mounting an omnidirectional microphone to the ceiling approximately on a line between the center of the first differential microphone and the loudspeaker, adjusting the phase of sound captured by the omnidirectional microphone, adjusting the amplitude of sound captured by the omnidirectional microphone; and subtracting the phase and amplitude adjusted sound captured by the omnidirectional microphone from the sound captured by the sound capture device. In some examples, the method comprises receiving a first signal from the first differential sound capture device, receiving a second signal from the second differential sound capture device, determining which of the first and second signal has the highest energy in each of a plurality of frequency bands, selecting either the first or second signal based on which has the highest energy in the majority of the plurality of frequency bands, and outputting the selected signal.

In some examples, a ceiling mountable second-order differential microphone module is provided including a solid planar baffle having a generally centered aperture, at least one mounting foot to suspend the solid planar baffle approximately parallel with a rear reflecting plane and to space the solid planar baffle at a predetermined distance below the rear reflecting plane, and a differential microphone sealably coupled to the planar baffle with a first side of the differential microphone acoustically exposed to an area above the planar baffle and a second side of the differential microphone acoustically exposed to an area below the planar baffle. In some examples, the predetermined distance is approximately 0.5", the solid planar baffle is circular with a diameter of approximately 1.75", and the differential microphone is a cardiod electret capsule.

DETAILED DESCRIPTION

The present disclosure improves audio capture in conference rooms and other spaces with a simplified and cost-effective design. Examples provide a simple ceiling mounted microphone structure in various arrangements to capture a stronger audio signal and with reduced noise without cluttering a conference room table with intrusive microphones and without the use of complex array microphones. The disclosed microphone structure and placement provide these benefits without the need for compute intensive signal processing or costly arrays of microphones but may be combined with signal processing for additional benefits. Examples provide a simplified audio capture approach with improved quality even when one or more audio capture devices are placed near loudspeakers.

Specific embodiments of the invention will now be described in detail with reference to the accompanying figures. Like elements in the various figures may be denoted by like reference numerals for consistency.

Figure 1:
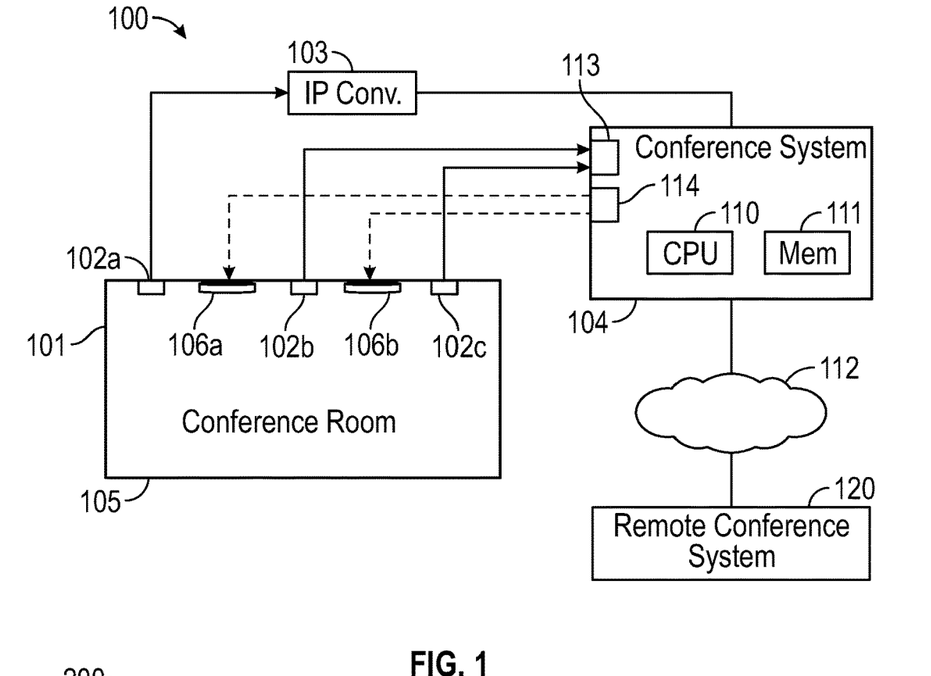
FIG. 1 is an illustration of an example conferencing system.

FIG. 1 is an illustration of a conferencing system, according to examples of the present disclosure. Conferencing system 100 includes three image derived microphones 102a-102c installed in ceiling 101 of conference room 105. Image derived microphones 102 are detailed further in reference to FIGS. 3, 6, and 7 below and in Chu U.S. Pat. No. 10,940,657 (FIGS. 6 and 7, col. 12, 1.38—col. 13, 1.10, and col. 13, 1.33—col. 14, 1.23). Image derived microphone 102a is connected via an analog cable to an analog input in microphone internet protocol (IP) adapter 103. Microphone IP converter 103 is connected via an IP network connection to conference system controller 104 to provide one or more microphone inputs to conferencing system controller 104. In some examples, conference system controller 104 may provide a plurality of microphone connections 113 including analog to digital converters (ADC) for direct connection to microphones 102b—c. In some examples, conference system controller 104 may provide speaker outputs including one or more power amplifiers and digital to analog converters (DAC) 114 to drive in-ceiling speakers 106a—b.

Microphone IP converter 103 digitizes one or more analog microphone signals to enable further processing and IP communications. In some examples, microphone IP converter 103 determines which microphone signal is strongest at a given moment, selects that signal as the active signal, and passes the active microphone signal to conference system controller 104. Conference system controller 104 includes processor 110, memory 111, and a network connection to network 112. Processor 110, in one embodiment, is configured to capture local audio and/or video from conference room 105 and transmit a live feed of that captured audio/video to a remote conferencing system over a network connection. Processor 110 is also be programmed to receive a live audio/video stream from one or more remote conferencing systems. The software running on processor 110 may include one or more components of the Polycom RealPresence™ video architecture or may support other video conferencing platforms such as Teams™, Skype™, or WebEx™. Memory 111 may include non-transitory computer readable memory such as flash memory or a hard-drive. Conference system controller 104 transmits an audio feed (which may include an active microphone signal) to one or more remote conference locations 120 and drives one or more speakers 106a—b in conference room 101 with a received audio signal from one or more remote locations. In some examples, conference system controller 104 receives multiple streams of microphone data from microphone IP converter 103, determines which microphone signal is strongest at a given moment, selects that signal as the active signal, and transmits the active signal to one or more remote locations. Conference system controller 104 may also include video conferencing functions and/or voice over IP (VOIP) connectivity.

Figure 2:
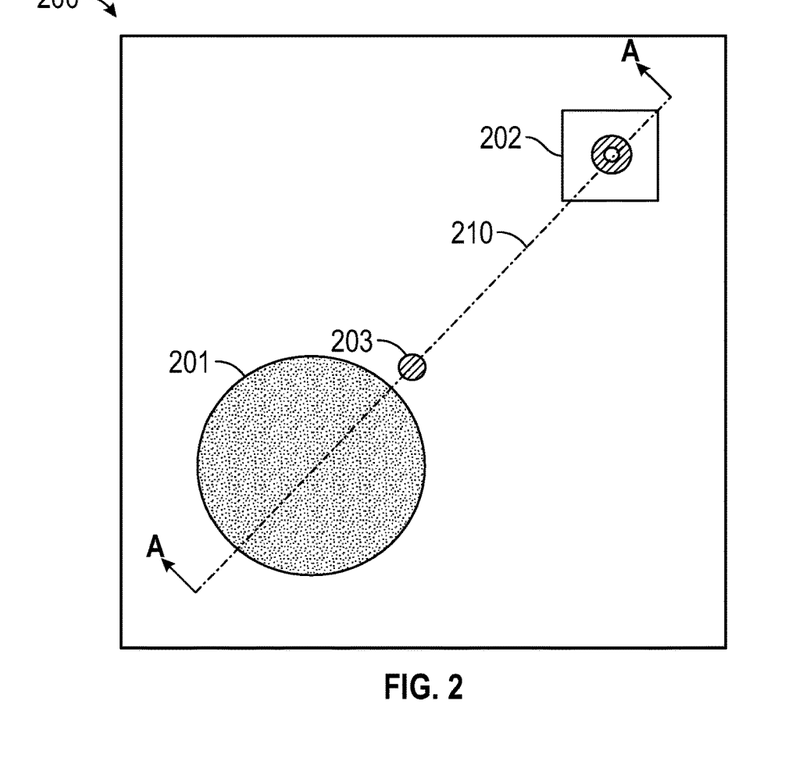
FIG. 2 is a plan view of an example configuration of a speaker and image derived microphone mounted in a ceiling tile.

FIG. 2 is plan view of an example configuration of a speaker and an image derived microphone mounted in a single ceiling tile 200. Ceiling tile 200 includes loudspeaker 201 and image derived microphone 202. In some examples, ceiling tile 200 can be a standard 2'×2' drop ceiling tile modified by providing one or more holes or recesses to accept loudspeaker 201 and image derived microphone 202. In some examples, ceiling tile 200 is manufactured specifically to accept or incorporate loudspeaker 201 and image derived microphone 202. In some examples, ceiling tile 200 may include omnidirectional microphone 203 located between loudspeaker 201 and image derived microphone 202. Cutline 210 illustrates the cut line for cross-section A-A illustrated in FIG. 3, below.

Figure 3:
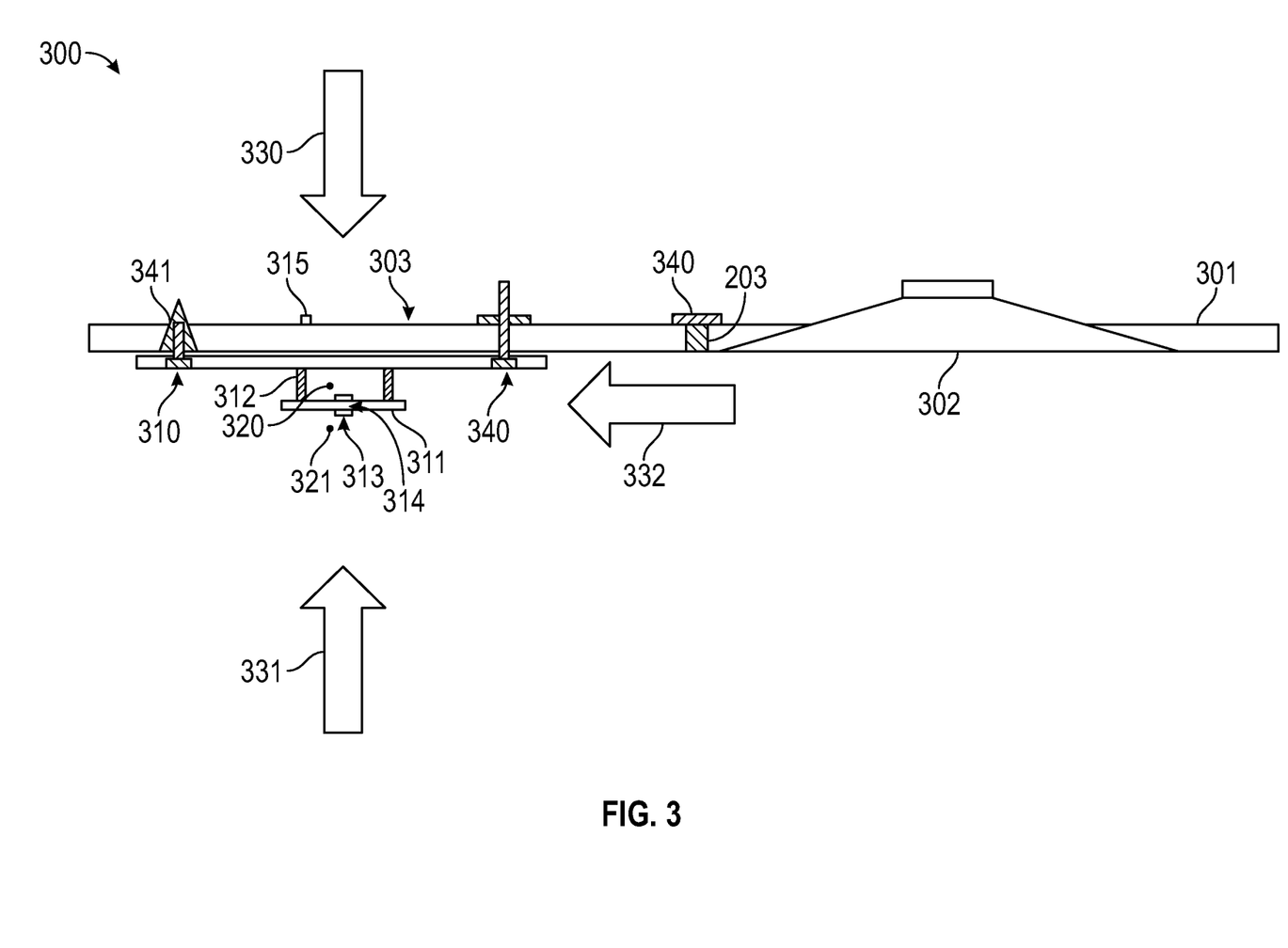
FIG. 3 is a cross-section along A-A (an illustration of a cross sectional view of an example speaker and image derived microphone mounted in a ceiling tile.

FIG. 3 is a cross-section along A-A of an example configuration of a speaker and image derived microphone mounted in a ceiling tile, according to examples of the present disclosure. Audio installation 300 includes ceiling surface 301, loudspeaker 302, and image derived microphone 303. In some examples, ceiling surface 301 is a drop ceiling tile commonly manufactured from a sound-absorbing fiber material such as a standard 1'×1', 2'×2', or 2'×4' ceiling tile. In some examples, ceiling surface 301 is gypsum board, plaster, wood, or other sound reflective material.

Image derived microphone 303 incorporates a differential microphone element within a structure that guides sound waves arriving from the side to flow across the microphone element without forming differential pressures across the element. In contrast, sound waves arriving towards the face of the image derived microphone produce differential pressures on the microphone element and generate a microphone signal. Image derived microphone 303 may include sound reflecting surface 310, baffle 311, mounting legs 312, and differential microphone 313. Sound reflecting surface 310 may be a piece of hard resin attachable to the ceiling material using adhesive strips or fastening hardware. In some examples, sound reflecting surface may be mounted using a molly-bolt style anchor 340, a generally conical wallboard-style anchor 341, or other anchor suitable for mounting a structure to a thin material such as wallboard or acoustic ceiling tile. Anchors 340 and 341 are suitable mounting means for mounting the image derived microphone 303 (e.g., sound reflecting surface 310) to the ceiling material. Other suitable mounting means include rotatable tabs 511 and spring-loaded clips 512 (discussed below). In some examples, sound reflecting surface 310 is a six-inch square plate clipped to a drop ceiling support grid. Baffle 311 may be a resin disk approximately 1.75" in diameter with an aperture 314 formed in the center to accommodate differential microphone 313. The gap between baffle 311 and differential microphone 313 may be filled with a suitable sealant such as a bead of silicone caulk. In some examples, an elastomeric grommet may be used to hold differential microphone 313 in position in the aperture and ensure the interface is sealed. Differential microphone 313 may be a standard cardioid electret capsule such as the Primo™ EM325. Mounting legs 312 hold baffle 311 parallel to sound reflecting surface 310 and spaced at a consistent distance. In some examples, mounting legs 312 hold baffle 311 one half inch away from sound reflecting surface 310. Mounting legs 312 may be molded or formed integrally with sound reflecting surface 310, baffle 311, or both. A mounting leg 312 may enclose an electrical wire 315 carrying the output signal from differential microphone 313.

In operation, differential microphone 313 generates an electrical microphone signal only when the pressure imparted by an acoustic wave at interior point 320 differs from the pressure at exterior point 321. Acoustic waves 330 from above the ceiling surface (e.g., noise from an air handler) are either absorbed by the ceiling surface or reflected by sound reflecting surface 310. The region above the ceiling surface is a null of image derived microphone 303. Acoustic waves from a person speaking directly below microphone 313 will register because they will impart much greater pressure at exterior point 321 than at interior point 320. In contrast, acoustic waves 332, for example those arriving from loudspeaker 302, impart roughly identical pressures at interior point 320 and exterior point 321 and eliminates or heavily attenuates any electrical microphone signal in differential microphone 313. The location of loudspeaker 302 is another null of image derived microphone 303. This second null (to the sides of the microphone) also eliminates or attenuates vent noise and acoustic reflections from the side walls of the room.

Attenuation of acoustic reflections from the side walls of the room reduces the "cave" artifact of a talker sound pickup directly beneath the microphone. Image derived microphone 303 mounted flush to the ceiling and pointed down provides much better audio quality than conventional directional microphones. With conventional directional microphones, e.g., cardioid microphones, the ceiling distorts the directional pattern so they are often suspended below the ceiling to provide separation from the ceiling of a few feet. Many customers do not want hanging objects in their conference rooms. The directionality of image derived microphone 303 provides a 4 dB decrease in reverberance compared to a common cardioid unidirectional microphone. For example, capture of talking 10 feet away by image derived microphone 303 will be of a comparable quality to a capture from 6.3 feet by a common cardioid unidirectional microphone.

In some examples, loudspeaker 302 may be selected to direct sound primarily in a downward direction. For example, loudspeaker 302 may include a large driver with increased directivity. A speaker may be considered directional when $\lambda=D$, where D is the loudspeaker diameter. Also, $\lambda=v/f$, where v is the speed of sound and f is the frequency of interest. If we use 13600 in/s as the speed of sound and 2000 Hz as frequency threshold, D=6.8. Thus, loudspeaker with a diameter of approximately 6.8 inches will be directional (i.e., will have deep nulls to the sides of the speaker) at 2000 Hz and higher frequencies. In another example, a loudspeaker with a diameter of approximately 8 inches will have deep nulls in a horizontal direction at 1700 Hz and higher frequencies. In another example, loudspeaker 302 may comprise an array of small, phase-synced speakers to limit the sideways spread of sound from loudspeaker 302.

In some examples, ceiling tile 301 may include a flush mounted omnidirectional microphone 203 located between loudspeaker 302 and image derived microphone 303. Omnidirectional microphone 203 may be located on a line between loudspeaker 302 and image derived microphone 303 and may be located closer to loudspeaker 302 than image derived microphone 303. Omnidirectional microphone 203 may be held in place with retaining flange 340, for example. In some examples, omnidirectional microphone 203 may be used to further attenuate or eliminate feedback from acoustic waves 332. The signal from omnidirectional microphone 203 may be subtracted from the signal from image derived microphone 203 to produce a near-field null towards the loudspeaker. Frequency sub-band weighting may be used to tune the near-field null. This subtracted signal does not significantly affect a signal at image derived microphone 303 from a sound source below. This signal processing may be performed by CPU 110 in conference system controller 104. In some examples, an analog circuit may be provided at or near omnidirectional microphone 203 and may provide inputs for adjusting the circuit. In some examples, an analog or digital subtraction circuit may be provided as part of microphone IP adapter 103.

In some examples, specific components may be sold as a set including loudspeaker 302, image derived microphone 303, and omnidirectional microphone 203. These may be pre-installed in a drop ceiling tile or may be provided with an installation template for installing the components in a customer-supplied ceiling or ceiling tile. Such a set may be factory tuned to determine the frequency sub-band weighting. For example, a set may include an 8 inch diameter loudspeaker placed at one corner of a 2'×2' ceiling tile and an image derived microphone placed at an opposite corner with omnidirectional microphone 203 placed in the center of the ceiling tile. Calibration tests may be performed in a sound-isolated and sound-deadening room to measure the pickup at each microphone of sound emitted by the loudspeaker. For each frequency sub-band test the sound level captured by the omnidirectional microphone in that band may be adjusted by a amplitude adjustment factor to match the sound level captured by the image derived microphone.

Similarly, the phase of the sound captured by the omnidirectional microphone may be sequentially adjusted to determine a maximal phase adjustment for that band. In one example, a processor might cycle through a predetermined range of amplitude adjustment factors for each of a predetermined range of phase adjustments to determine the pair of amplitude adjustment factor and phase adjustment factor that most effectively nullifies the test audio. This amplitude adjustment factor and phase value may be added to a calibration table entry corresponding to the currently tested frequency sub-band. This calibration table may be programmed into a signal processor to enhance the near-field null of the image derived microphone by subtracting an attenuated portion of the signal picked up by the omnidirectional microphone (along with any phase adjustment) from the signal captured by the image derived microphone. In other examples, conference system 104 may include an autocalibration routine to perform a calibration process for each speaker/microphone set after the speakers and microphones have been installed in a room.

Figure 4:
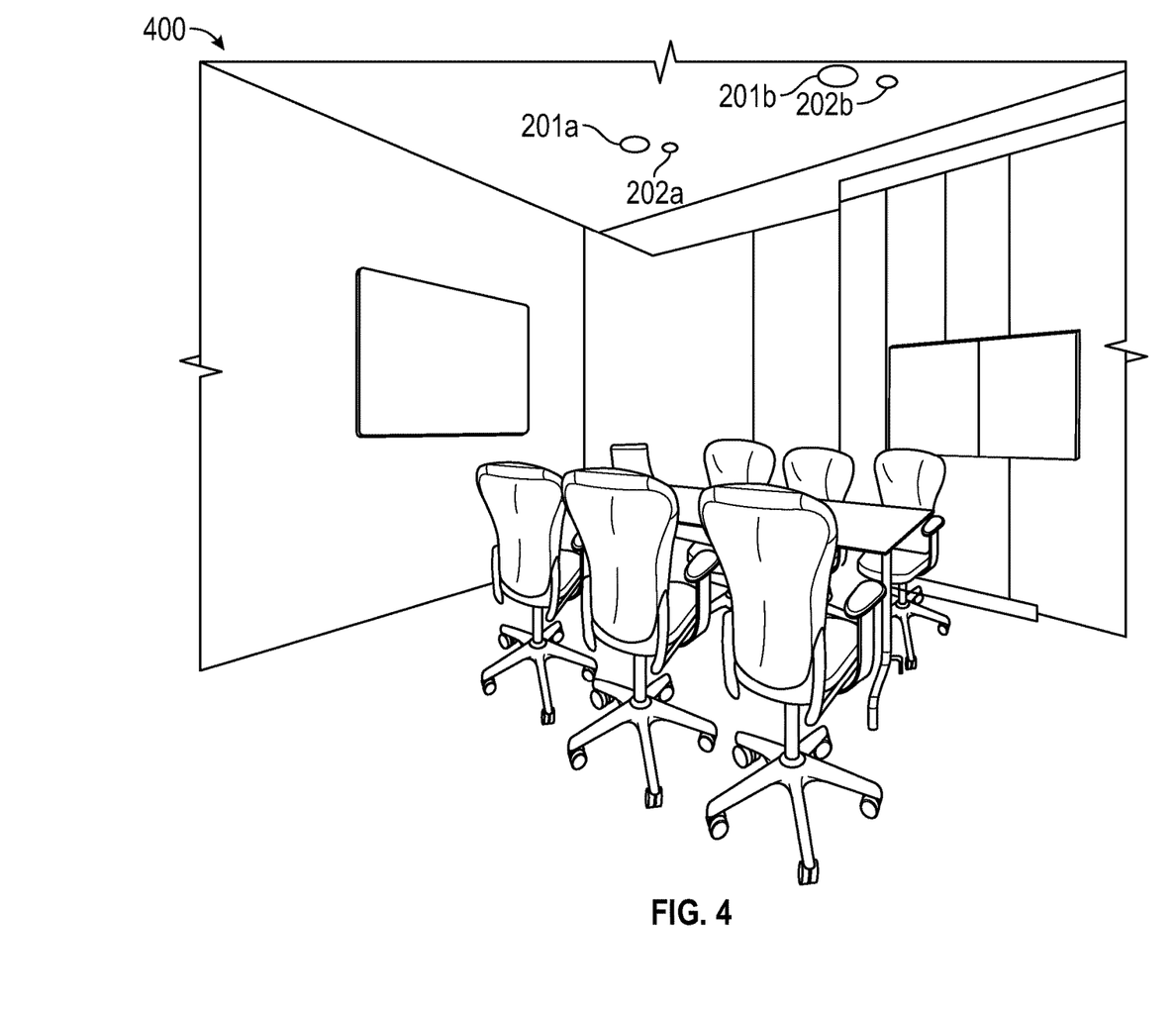
FIG. 4 is an illustration of a conference room incorporating an example conferencing system.

FIG. 4 is an illustration of a conference room incorporating an example conferencing system. The conference room includes drop-ceiling 400 (made of ceiling tiles 301 suspended in a 2'×2' metal grid) and conference table 403. Mounted in two of ceiling tiles 301 are loudspeakers 201a and 201b as well as image derived microphones 202a and 202b. Image derived microphones 202a and 202b are spaced approximately four feet apart and are positioned over conference table 403. This four-foot distance corresponds to the edge of the effective microphone pickup range per the polar plot in FIG. 8. In that plot, approximately 40 degrees off center is the edge of the pickup zone. Further, in a typical conference room the ceilings are 108" high and seated individuals heads are roughly 50" off the floor, or 56" from the ceiling. The 40-degree pickup angle thus translates to approximately four feet horizontally from the axis of the microphone. Higher ceilings may allow wider spacing of image derived microphones 202a and 202b. Loudspeakers 201a and 201b are similarly spaced and positioned. Further, loudspeakers 201a and 201b are positioned in the NULL region of image derived microphones 202a and 202b to minimize feedback in the conferencing system discussed above with regard to FIG. 3.

Figure 5A:
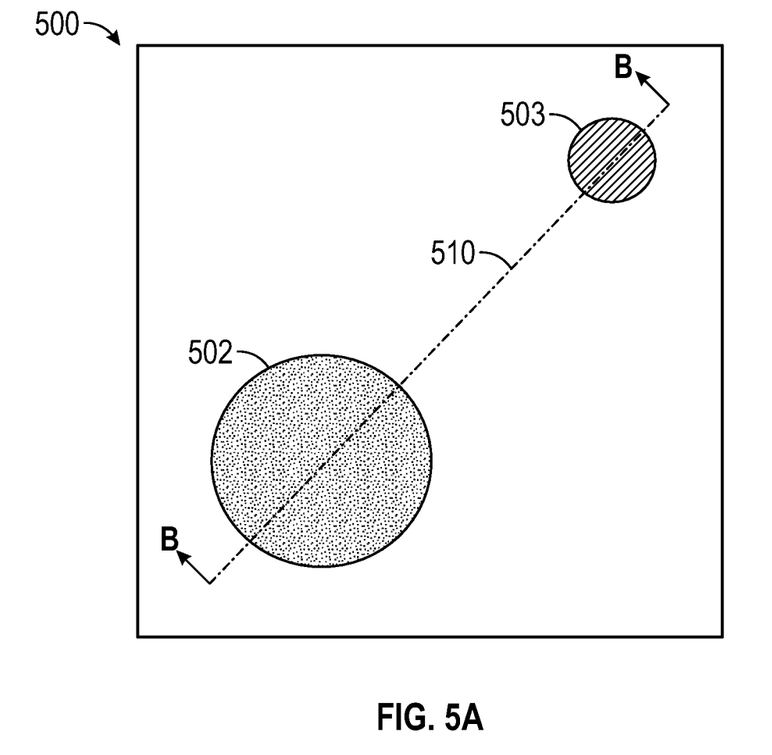
FIG. 5a is a plan view of an example configuration of an audio system incorporating a speaker and image derived microphone into a ceiling material.

FIG. 5a is a plan view of an example configuration of an audio system incorporating a speaker and image derived microphone into a ceiling material. Ceiling material 500 includes speaker 501 and image derived microphone 502. Cutline 510 provides context for FIG. 5b as described below.

Figure 5B:
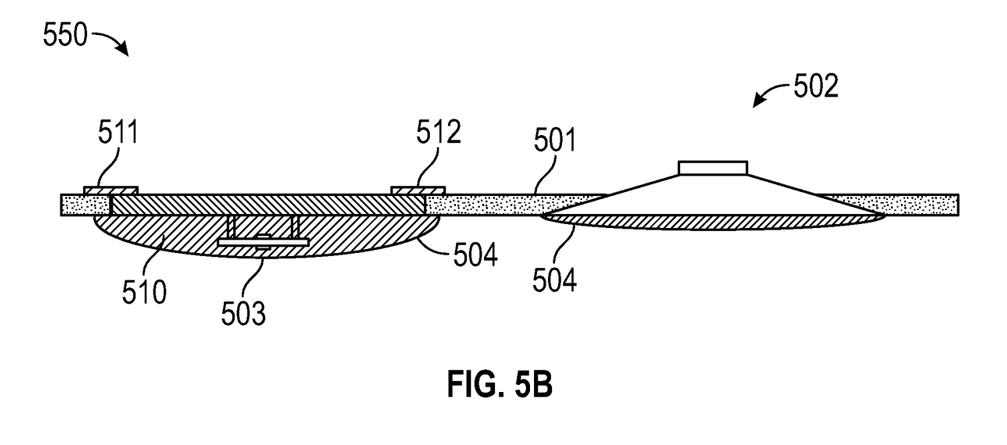
FIG. 5b is cross-section along B-B an illustration of an example configuration of an audio system including a speaker and an image derived microphone mounted in a standard ceiling tile.

FIG. 5b is a cross-section along B-B of an example speaker and image derived microphone incorporated into a room ceiling. In some examples, ceiling material 501 is a 2'×4' drop ceiling tile that has been modified to accommodate loudspeaker 502 and image derived microphone 503. Image derived microphone 503 includes sound reflecting surface 510, baffle 511, mounting legs 512, and differential microphone 513. Differential microphone 513 produces a signal representing changes in the air pressure differential between interior point 520 and exterior point 521. Sound reflecting surface 510 is generally flush with the lower surface of ceiling tile 501 to form a continuous back surface of image derived microphone 503. Sound reflecting surface 510 may be the lower surface of the ceiling tile if the ceiling tile surface is sound reflective. Loudspeaker 502 and image derived microphone 503 are both covered with acoustically transparent covers 504. In some examples, rotatable tabs 511 retain image derived microphone 503 in ceiling material 501. In some examples, spring-loaded clips 512 retain image derived microphone in ceiling material 501. In some examples, the entire ceiling may be formed with sound reflecting surface 510 to eliminate the need for tabs 511. Rotatable tabs 511 and spring-loaded clips 512 are suitable mounting means for mounting the image derived microphone 503 (e.g., sound reflecting surface 510) to the ceiling material. In other examples, sound reflecting surface 510 may be formed directly on the ceiling material to eliminate the need for tabs 511. In some examples, a single acoustically transparent cover 504 is provided to cover both image derived microphone.

Figure 6:
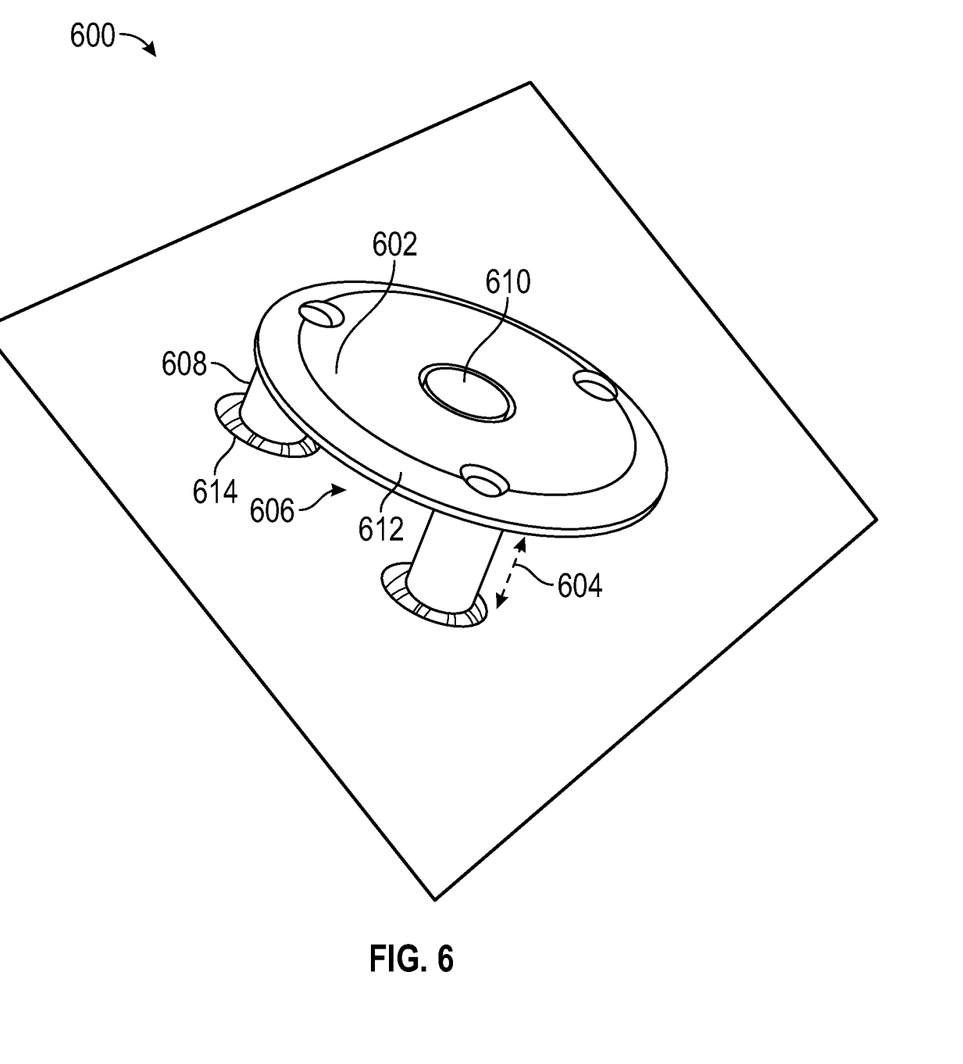
FIG. 6 is an illustration of an example image derived microphone.

FIG. 6 is an illustration of an example image derived microphone. Image derived microphone includes baffle 602 spaced distance 604 from and parallel to acoustically reflecting surface 606. Baffle 602 is spaced by feet 608, which may be formed with or integral to baffle 602 and/or acoustically reflecting surface 606. Baffle 602 includes an aperture sealingly fitted with differential microphone 610. In some examples feet 608 attach directly to ceiling surface 614. Operation and use of a single second-order microphone 600 is described in U.S. Pat. No. 4,965,775 (though the placement and arrangement of one or more second-order microphones combined with the other features shown herein are not known and represent an improvement over similar audio devices for the reasons given elsewhere herein.

The second-order microphone 600 includes a disc 602 mounted a distance 604 from an audio-reflective surface 606 via one or more posts, such as post 608. The distance 604 may be varied to change the frequency range of operation of the second-order microphone 600, though in one specific example the distance may be 0.45 inches. Similarly, the disc 602 may be varied in size and shape, though in one specific example the disc 602 may be 1.5 inches in diameter.

A microphone receiver 610, which may be a first-order microphone, may be disposed in the center of the disc 602, or may be disposed elsewhere within the disc 602. The microphone receiver 610 may be a variety of different microphone elements, though in a specific embodiment the microphone receiver 610 may be a cardioid electret capsule. The microphone receiver 610 is connected to a processor or processing electronics via an electrical lead (not shown), which is disposed through the audio-reflective surface 606 and into the microphone receiver 610.

Optionally, one or more feet, such as foot 614, may be used to secure the posts, such as post 608. The feet may also provide vibration dampening so that vibrations in the audio-reflective surface 606 (whether caused by audio waves or other vibration of the audio device) contribute less or no signal to the sound wave signals detected by the microphone receiver 610. The feet may also be referred to as pads, dampeners, rings, or seals.

Figure 7:
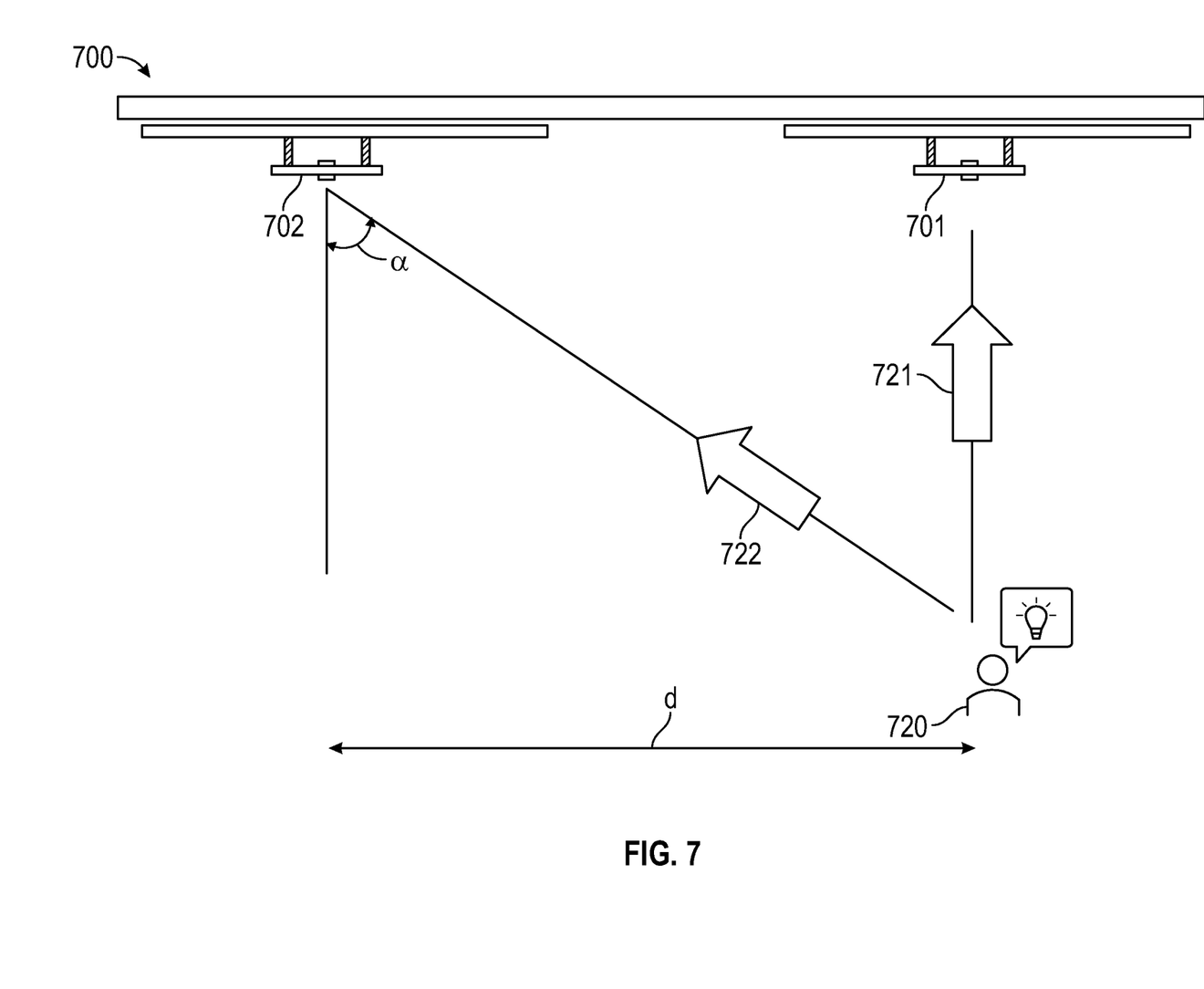
FIG. 7 is an illustration of an example pair of image derived microphones.

FIG. 7 is an illustration of an example pair of image derived microphones. Conference room 700 includes image derived microphone 701 located directly above conference participant 720, which is spaced at distance d from image derived microphone 702. Sound waves from participant 720 travel vertically along path 721 to image derived microphone 701. Sound waves from participant 720 also travel diagonally along path 722 to image derived microphone 702. Path 722 diverges from vertical at angle α. This geometry provides context for the polar plot of FIG. 8.

Figure 8:
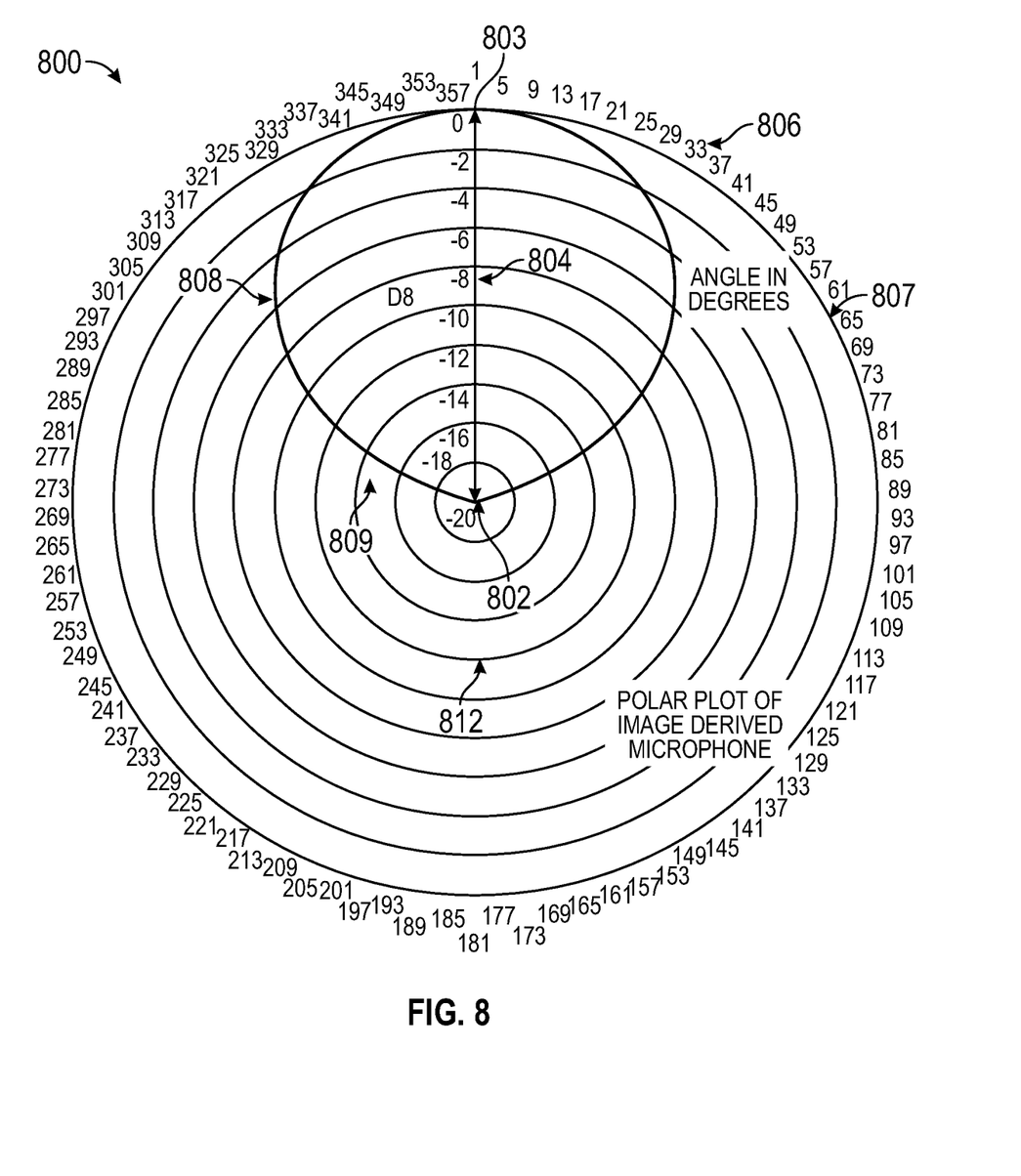
FIG. 8 is a graph of a polar plot of audio reception in an image derived microphone such as the microphone, according to examples of the present disclosure.

FIG. 8 is a graph of a polar plot of audio reception in an example image derived microphone. Graph 800 includes center point 802, which is the location of image derived microphone 702 but could also be the location of image derived microphone 701. The polar plot shows magnitude in relation to an angle. The radii drawn in FIG. 8 reflect the physical distance from microphone 702 to the source (e.g., participant 720). The greater the distance from microphone 702 to the source, the more attenuated the audio signal. The degree of attenuation of the strength of the audio signal is measured in decibels (dB). In FIG. 8, if the audio source were located at point 803 from the center point 802 along radius 804, then the attenuation of audio source 720 captured at microphone 702 would measure 0 dB. In other words, if the audio source were directly below the microphone (i.e., participant 720 is directly below microphone 701) the attenuation would measure 0 dB. This is the strongest pickup of audio source 720. Angles tick marks 806 correspond to α in relation to vertical reference line 804. Radius 807 represents an angle α of approximately 70 degrees. Plot 808 shows the physical areas in which the image derived microphone can detect sound waves. This ability varies both with the distance to the source of the sound waves and with the angle α.

In this example, image derived microphone 702 has a −3 dB pickup angle of approximately ±30 degrees. For a typical 9-foot ceiling, this defines a pickup circle of approximately 6 feet in diameter. Participants will often be seated in various locations in a room and each participant should be covered by a 6-foot diameter circle under a corresponding image derived microphone. In some examples, image derived microphones may be arranged with overlapping pickup regions to avoid dead zones.

When more than one microphone may capture a participant's voice, a microphone selection algorithm may be implemented to select a single active microphone. In some examples, each microphone signal is processed to determine the energy in each of a set of audio sub-bands. The signal with the maximum energy across the most sub-bands may be selected. For example, a frequency band of 500 Hz to 1500 Hz may be divided into 40 sub-bands (each with a 25 Hz width).

Figure 9:
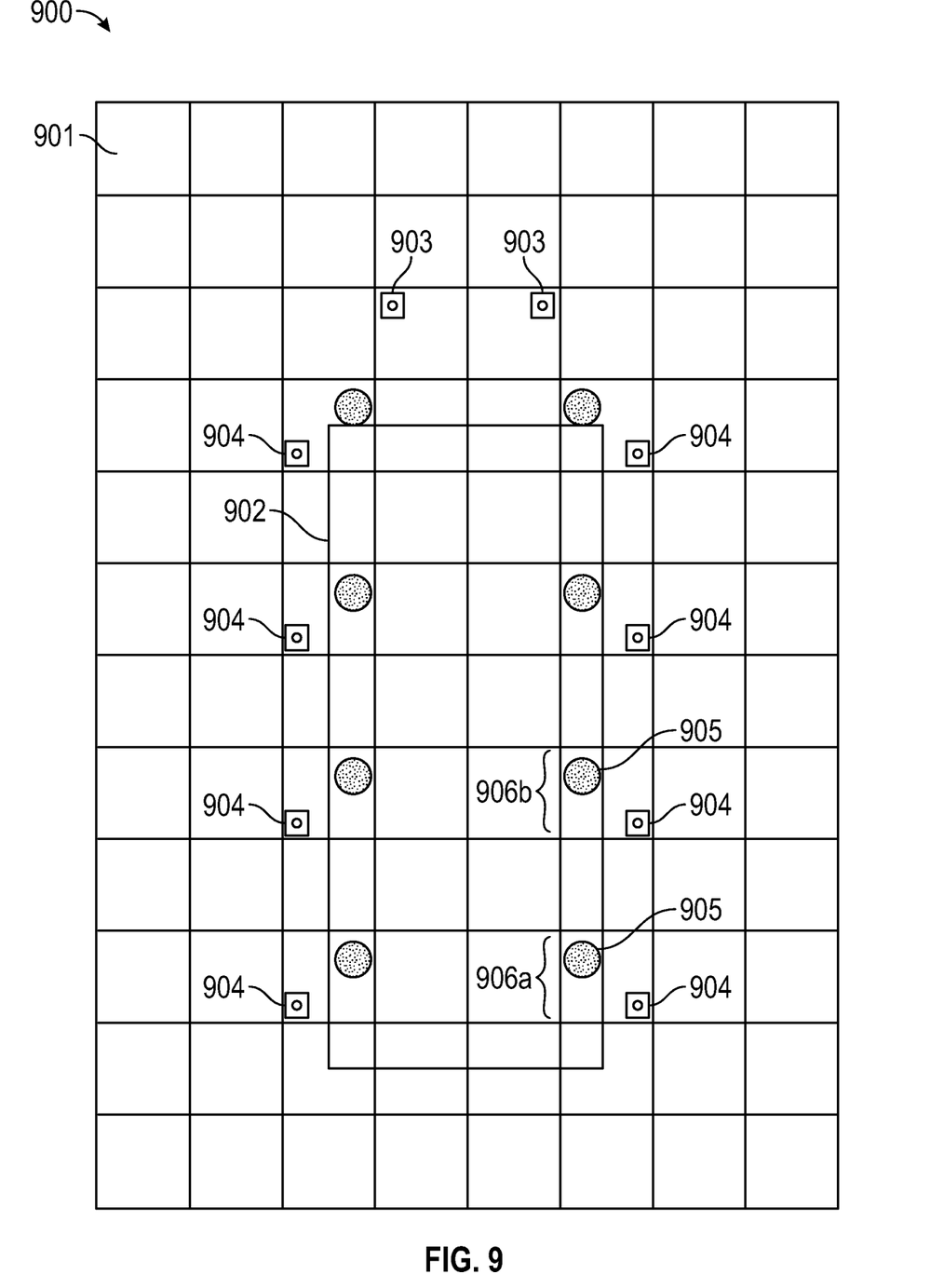
FIG. 9 is an illustration of a conference system installation layout aligned with a drop ceiling grid.

FIG. 9 is an example illustration of a conference system installation layout aligned with a 2'×2' grid. Room layout 900 illustrates a ceiling grid comprising tiles 901 and suspended over conference table 902. Speakers 905 are spaced over the table along with image derived microphones 904 to provide coverage of most seating positions. These speaker/microphone module units may be provided to installers as a preassembled unit for ease of installation. In some examples, additional image derived microphones 903 and may be provided for additional coverage of potential speakers. For example, microphones 903 may be placed above locations where presenters are expected to stand during presentations. Directly above seating locations 906a and 906b is a ceiling grid tile (or portion of ceiling material) incorporating image derived microphone 904 and loudspeaker 905.

Figure 10:
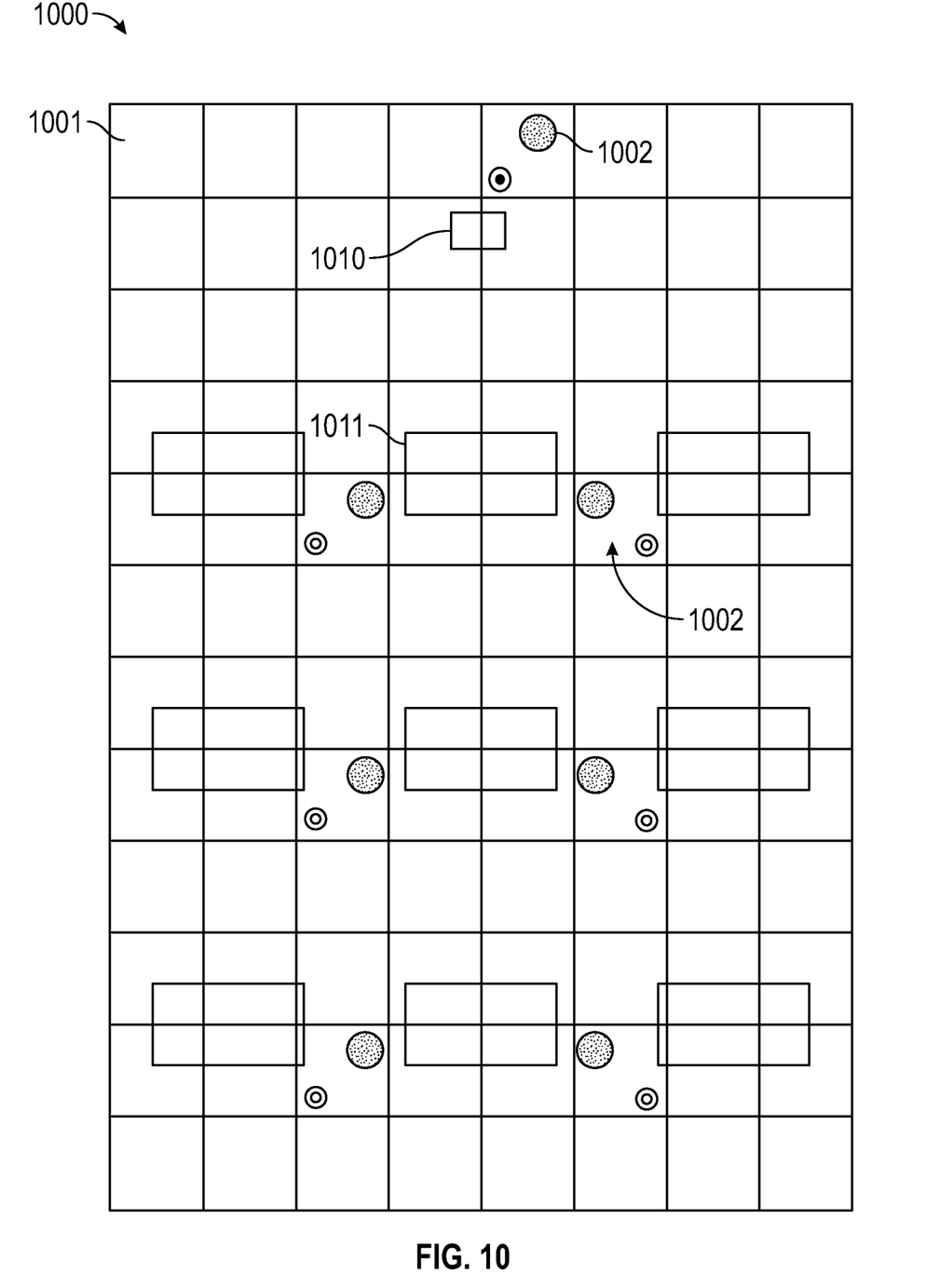
FIG. 10 is an illustration of an example conference system installation layout aligned with a drop ceiling grid.

FIG. 10 is an illustration of an example conference system installation layout aligned with a drop ceiling grid. Room layout 1000 illustrates a drop ceiling grid comprising tiles 1001 suspended over training room desks 1011. Combined microphone/speaker tiles 1002 are laid out above the training room desks and above lectern 1010 to provide full coverage of all participants.

Figure 11:
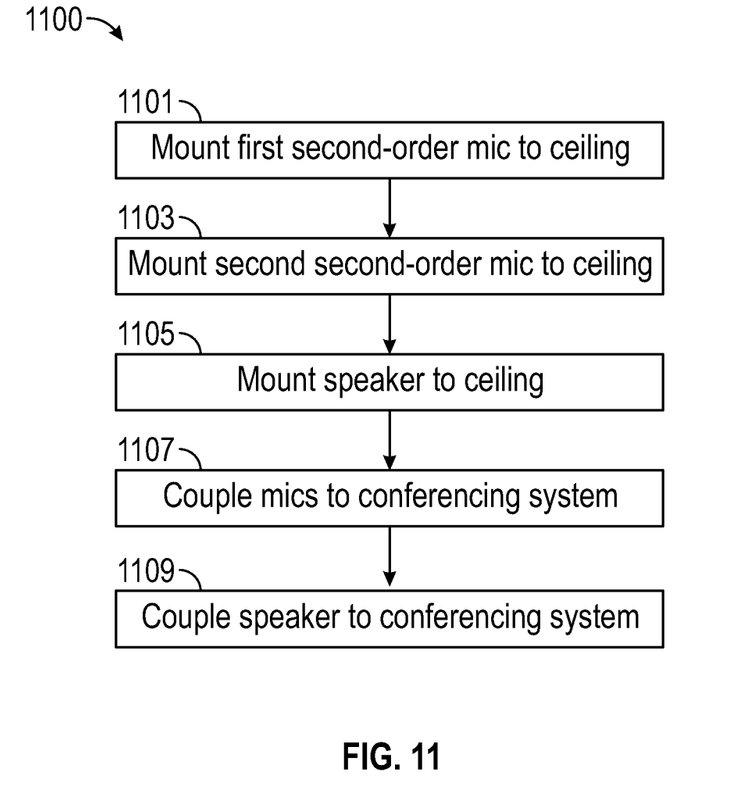
FIG. 11 is an example method for capturing audio in a conference room.

FIG. 11 is an example method for capturing audio in a conference room. At block 1101, a first second-order microphone is attached to the ceiling of a room. At block 1103, a second second-order microphone is attached to the ceiling of the room at some separation from the first microphone. At block 1105, a speaker is mounted to the ceiling. At block 1107, the microphones are coupled to a conferencing system. At block 1109, the speaker is coupled to the conferencing system.

Figure 12:
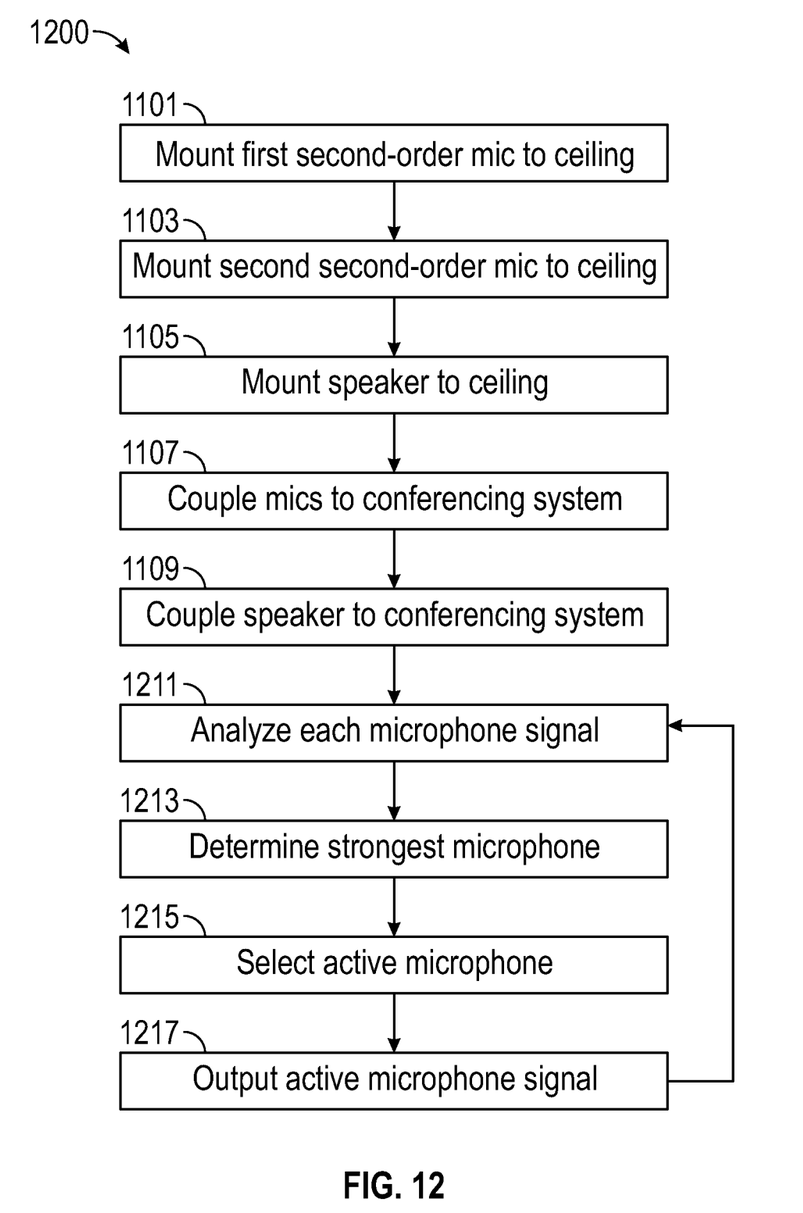
FIG. 12 is an example method for capturing audio in a conference room.

FIG. 12 is an example method for capturing audio in a conference room. At block 1211, a signal from each microphone is analyzed by filtering a band corresponding to the dominant frequencies of spoken word. For example, a microphone signal may be analyzed over the band from 500 Hz to 1500 Hz. The microphone signal may then be analyzed over sub-bands to determine the maximum energy in each sub-band. For example, a microphone signal may be analyzed over each of forty 25 Hz sub-bands between 500 Hz to 1500 Hz to determine the maximum energy in each sub-band. At block 1213, the energy levels of each sub-band of each microphone are compared to identify the microphone with the strongest signal. At block 1215, the identified microphone is selected as the active microphone. At block 1217, the signal from the active microphone is output to the conferencing system for an interval of time. At the end of the time interval, blocks 1211-1217 are repeated.

Although example embodiments have been described above, other variations and embodiments may be made from this disclosure without departing from the spirit and scope of these embodiments.

What is claimed is:

1. An audio system comprising:
a loudspeaker; and
a sound capture device comprising:
a solid rear reflecting plane mountable to a room ceiling,
a solid planar baffle parallel with the rear reflecting plane and spaced at a distance below the rear reflecting plane, the planar baffle having a generally centered aperture,
a differential microphone sealably coupled to the planar baffle with a first side of the differential microphone acoustically exposed to an area above the planar baffle and a second side of the differential microphone acoustically exposed to an area below the planar baffle, and
a mounting means for mounting the solid rear reflecting panel to the room ceiling.

2. The system of claim 1, wherein the sound capture device is incorporated into a drop ceiling tile along with the loudspeaker having a diameter at least approximately 6.7".

3. The system of claim 1, wherein the solid planar baffle is circular with a diameter of approximately 1.75" and is spaced approximately 0.5" from the rear reflecting plane and wherein the microphone is a cardioid electret capsule.

4. The system of claim 1, comprising a ceiling mountable omnidirectional microphone, a ceiling mountable loudspeaker, and a controller comprising a plurality of microphone inputs and a sound nullifying circuit to:
receive a first microphone signal corresponding to the sound capture device and a second microphone signal from the omnidirectional microphone, and
subtract the second microphone signal from the first microphone signal.

5. The system of claim 1, further comprising a controller for receiving a plurality of microphone signals and a processor operable to:
receive a first microphone signal corresponding to the sound capture device and a second microphone signal from a second sound capture device,
determine which of the first and second microphone signal has the highest energy in each of a plurality of frequency bands,
select the microphone signal having the highest energy in the majority of the plurality of frequency bands, and
output the selected microphone signal.

6. The system of claim 5, wherein the plurality of frequency bands comprises 25 Hz wide sub bands spanning 500 Hz to 1500 Hz.

7. The system of claim 5, wherein:
the controller comprises a plurality of speaker outputs to drive a first speaker mounted within two feet of the sound capture device and a second speaker mounted within two feet of the second sound capture device, and
the controller operable to transmit the selected microphone signal to a remote conferencing location, receive an audio signal from the remote conferencing location, and output the received audio signal to the plurality of speaker outputs as part of a two-way audio conference.

8. The system of claim 7, wherein the controller is operable to transmit the selected microphone signal while outputting the received audio signal.

9. An apparatus comprising:
a drop ceiling tile;
a solid rear reflecting plane;
a loudspeaker; and
a first sound capture device affixed to the ceiling tile, the first sound capture device comprising:
  a solid planar baffle parallel with the solid rear reflecting plane and spaced at a distance below the solid rear reflecting plane, the solid planar baffle having a generally centered aperture, and
  a differential microphone sealably coupled to the solid planar baffle with a first side of the differential microphone acoustically exposed to an area above the solid planar baffle and a second side of the differential microphone acoustically exposed to an area below the planar baffle.

10. The apparatus of claim 9, wherein a lower surface of the drop ceiling tile forms the solid rear reflecting plane.

11. The apparatus of claim 9, wherein the loudspeaker has a diameter of at least approximately 6.7".

12. The apparatus of claim 11, comprising:
an omnidirectional microphone installed between the loudspeaker and the sound capture device; and
a sound nullifying circuit to, for each of a plurality of frequency bands:
  adjust the phase of sound captured by the omnidirectional microphone,
  adjust the amplitude of sound captured by the omnidirectional microphone, and
  subtract the phase and amplitude adjusted sound captured by the omnidirectional microphone from the sound captured by the first sound capture device.

13. The apparatus of claim 9, wherein the solid planar baffle is circular with a diameter of approximately 1.75" and is spaced approximately 0.5" from the rear reflecting plane and wherein the microphone is a cardioid electret capsule.

14. The apparatus of claim 9, wherein the solid rear reflecting plane is the lower surface of the ceiling tile.

15. The apparatus of claim 9, comprising a microphone selection circuit to:
receive a first signal from the first sound capture device,
receive a second signal from a second sound capture device,
determine which of the first and second signal has the highest energy in each of a plurality of frequency bands,
select either the first or second signal based on which has the highest energy in the majority of the plurality of frequency bands, and
output the selected signal.

16. The apparatus of claim 15, wherein the plurality of frequency bands comprises 25 Hz wide sub bands spanning 500 Hz to 1500 Hz.

17. The apparatus of claim 11, wherein the loudspeaker has a diameter at least approximately 6.7".

18. A method, comprising:
mounting to a ceiling a first differential sound capture device comprising a rear reflecting plane, a circular planar baffle parallel mounted parallel to and spaced approximately less than an inch from the rear reflecting plane, and a differential microphone sealed in the center of the baffle and acoustically exposed to each side of the baffle,
mounting to the ceiling a second differential sound capture device wherein the second sound capture device is mounted at least four feet from the first sound capture device,
mounting a loudspeaker to the ceiling, and
coupling the first and second sound capture devices to a conferencing system, and
coupling the loudspeaker to the conferencing system.

19. The method of claim 18, comprising:
mounting an omnidirectional microphone to the ceiling approximately on a line between the center of the differential microphone and the loudspeaker;
adjusting the phase of sound captured by the omnidirectional microphone;
adjusting the amplitude of sound captured by the omnidirectional microphone; and
subtracting the phase and amplitude adjusted sound captured by the omnidirectional microphone from the sound captured by the sound capture device.

20. The method of claim 18, comprising:
receiving a first signal from the first differential sound capture device,
receiving a second signal from the second differential sound capture device,
determining which of the first and second signal has the highest energy in each of a plurality of frequency bands,
selecting either the first or second signal based on which has the highest energy in the majority of the plurality of frequency bands, and
outputting the selected signal.

* * * * *